Oct. 2, 1951  A. D. ROBBINS  2,569,537
HUMIDITY CONTROL UNIT
Filed March 15, 1950  6 Sheets-Sheet 1

INVENTOR.
AZOR D. ROBBINS
BY *John H Graham*
HIS AGENT

Oct. 2, 1951  A. D. ROBBINS  2,569,537
HUMIDITY CONTROL UNIT
Filed March 15, 1950  6 Sheets-Sheet 3

INVENTOR.
AZOR D. ROBBINS
BY
HIS AGENT

Oct. 2, 1951 A. D. ROBBINS 2,569,537
HUMIDITY CONTROL UNIT
Filed March 15, 1950 6 Sheets-Sheet 6

INVENTOR.
AZOR D. ROBBINS
BY
John R Graham
HIS AGENT

Patented Oct. 2, 1951

2,569,537

UNITED STATES PATENT OFFICE 2,569,537

HUMIDITY CONTROL UNIT

Azor D. Robbins, Hempstead, N. Y., assignor to Specialties, Inc., Syosset, Long Island, N. Y.

Application March 15, 1950, Serial No. 149,766

13 Claims. (Cl. 98—1.5)

1

This invention relates generally to control of humidity particularly for sensitive instruments which may be temporarily or permanently affected thereby and more specifically relates to humidity control units for instruments which are airborne and are thus affected by pressures varying with altitude.

Many of the sensitive instruments used today for observation at high altitudes and for sighting targets contain optical systems which are susceptible to fogging while the precision parts may be temporarily disabled or even permanently injured, if subjected to conditions of humidity particularly of a higher order and sealing the instruments is not always effective.

Accordingly, the present invention provides a humidity control unit for such and kindred uses where the air or other atmosphere within the instrument casing is automatically maintained in a low humidity condition.

It is a further object of the present invention to provide a humidity control unit for an airborne instrument which operates under automatic control of changes of altitude.

Another object of the invention is to provide a humidity control device for a sealed optical instrument which will automatically keep the humidity within the instrument within certain bounds and will maintain those conditions automatically by changes in pressure.

Generally, in practicing this invention, a unit is provided which is attached to the instrument and communicates with the interior thereof through a body of a desiccant which may be heated if desired, the flow into and out of the instrument casing through said casing being determined by one or the other of two valves within the unit and acted upon by the internal pressure of the instrument casing and the external pressure of the atmosphere in which the instrument is.

Specifically, the humidity control unit according to the present invention comprises a desiccant container; a body of desiccant therein; openings at one end to expose the desiccant to an atmosphere; a first sealed chamber; a conduit connecting said first chamber with the other end of said container; a first flexible diaphragm forming one wall of said first chamber; a normally closed valve operatively connected to said first diaphragm to be opened thereby to provide flow of atmosphere through the first chamber of the conduit, the desiccant and out through the openings; a second chamber; a port through a wall of the second chamber; a second flexible

2 diaphragm forming a wall of the second chamber; and a normally closed valve between the first and second chambers operatively connected to said second diaphragm to be opened thereby to provide reverse flow of atmosphere through said desiccant from the openings in the container to the port in the second chamber.

Preferably, means are provided to heat the desiccant at least during the egress of internal atmosphere through the desiccant to the external atmosphere, to assist in removal of moisture during this part of the cycle.

Obviously, the humidity control unit of the present invention can be made as a separate unit for attachment to an existing instrument or alternatively, the unit, or parts thereof, can be incorporated within the instrument casing itself either by attaching the units or by so constructing the instrument enclosure that the working parts of the unit can be installed to operate as hereinafter described.

Furthermore, while preferably the desiccant container is made part of the unit, it is obvious that this could be isolated from the other parts if desired for any reason such as lack of space.

Reference is now made to the accompanying drawings illustrating one embodiment of the present invention, and forming a part hereof, in which.

Figure 1:
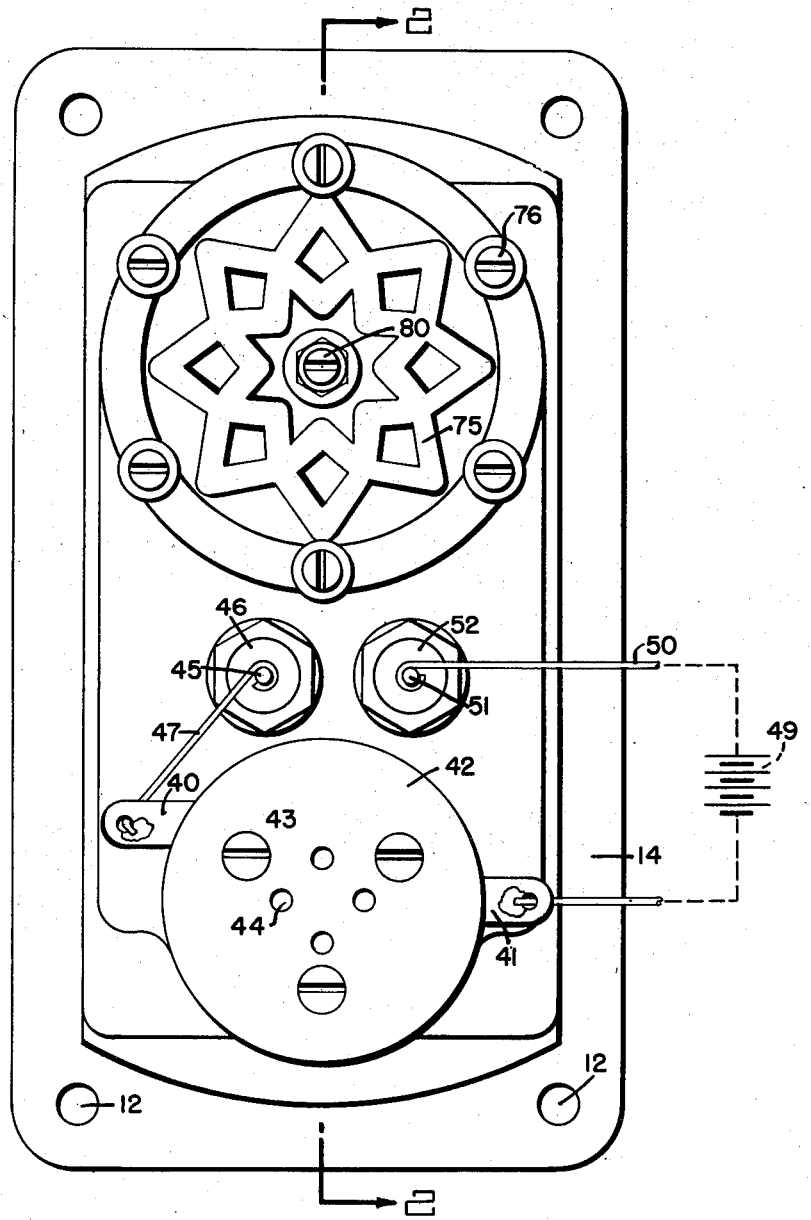
Figure 1 is a top plan view of the humidity control unit according to the present invention.
Figure 9:
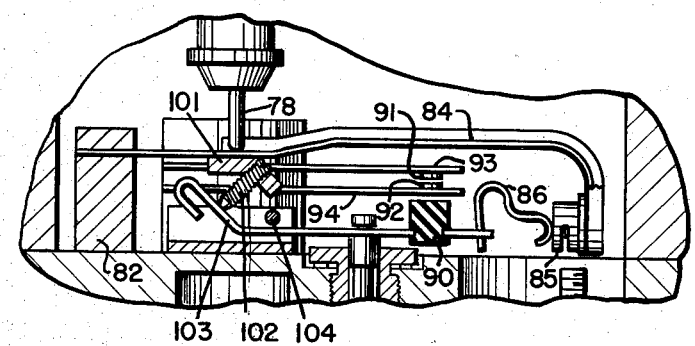
Figure 10:
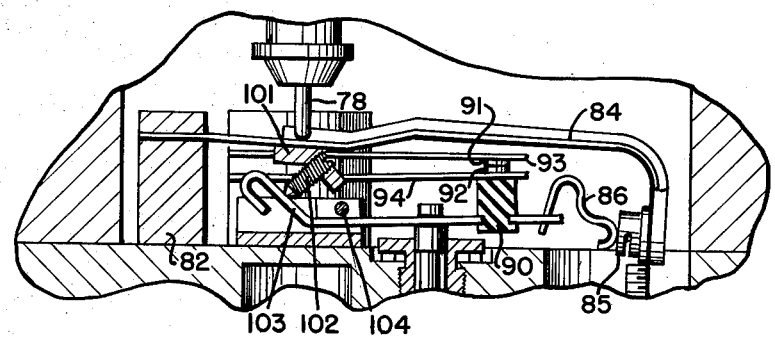
Figure 7:
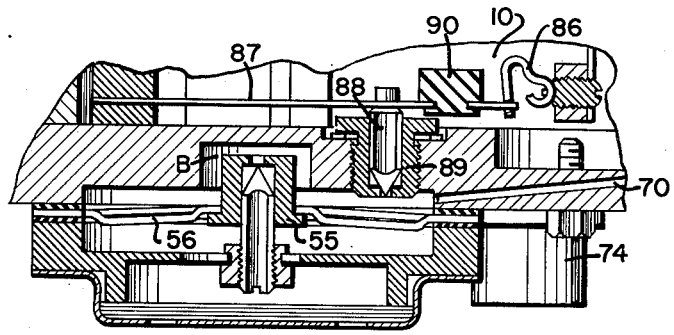
Figure 8:
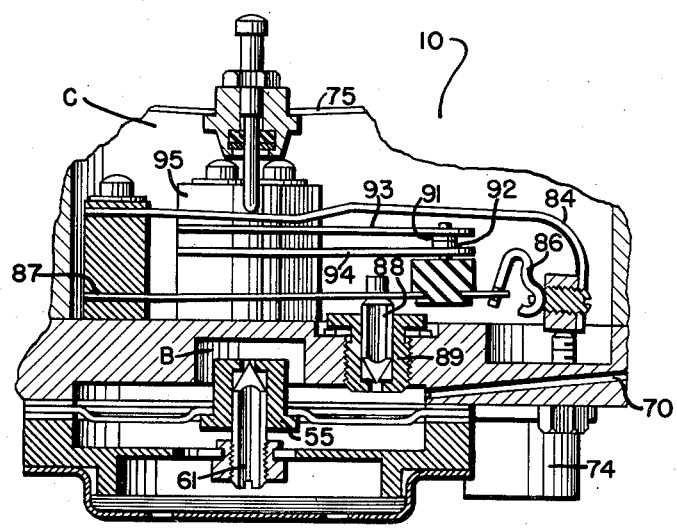

Figures 7 and 8 are detailed views of the switching and valve means of Fig. 1 in two different operating positions; and Figures 9 and 10 are detailed views similar to Figs. 7 and 8, showing a modified form of switching means.

Referring now specifically to the drawings, in Figs. 1, 2, 3, 4 and 5 there is shown a humidity control unit 10, according to the present invention, adapted to be associated with any type of instrument having an enclosing cavity, casing or chamber shown in part dotted at 11. The unit 10 will be suitably fastened to the chamber or casing 11 using mounting holes 12 and by conventional means will be pressure sealed thereto. It is to be realized that the chamber itself containing the instrumentalities of the device, will be pressure sealed with a body of air or other atmosphere therewithin. The present invention provides a pressure and humidity control unit for the atmosphere within the chamber, which unit is the only means of ingress and egress of air to the sealed off interior of the casing, except for possible minor leakages which may occur where the instrument casing is not hermetically sealed. As hereinafter brought out, such leakages, if they occur, will have little or no effect upon the efficiency and utility of the control device of the present invention.

Unit 10 is formed of two major parts, a base plate 13 having a flange 14 through which passes the mounting holes 12 and an upper casing 15 mounted on the plate 13 and fastened thereto by bolts 16 in conventional manner.

Figure 2:
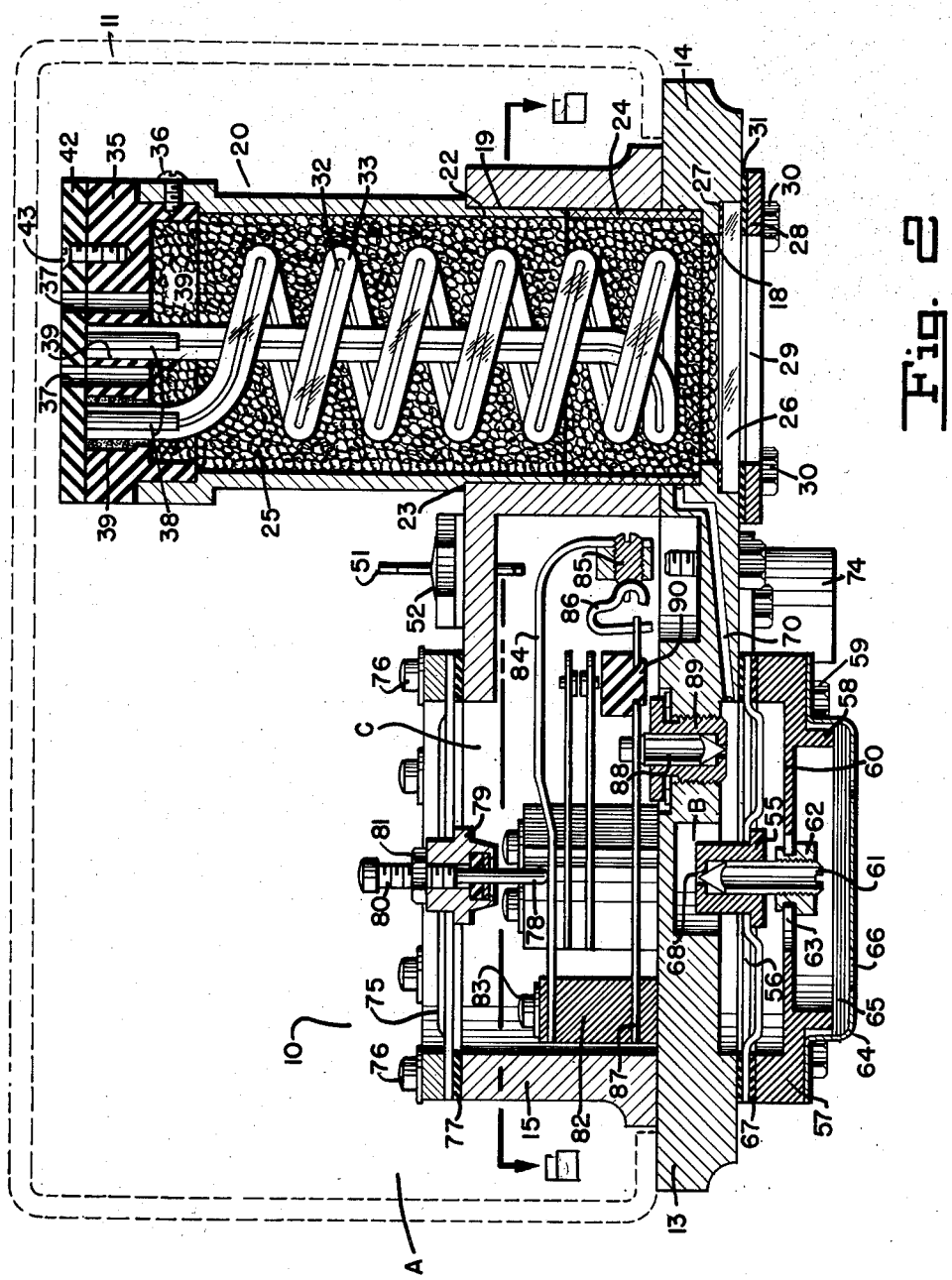
Figure 2 is a cross-section through the unit of Fig. 1 on the line 2—2 thereof.
Figure 3:
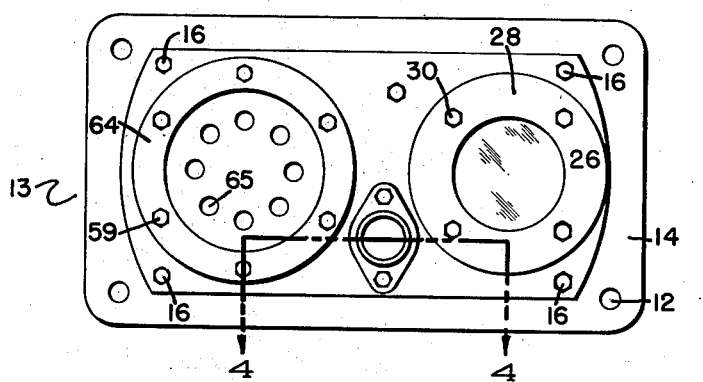
Figure 3 is a plan view of the bottom of the unit of Fig. 1, to reduced scale.
Figure 4:
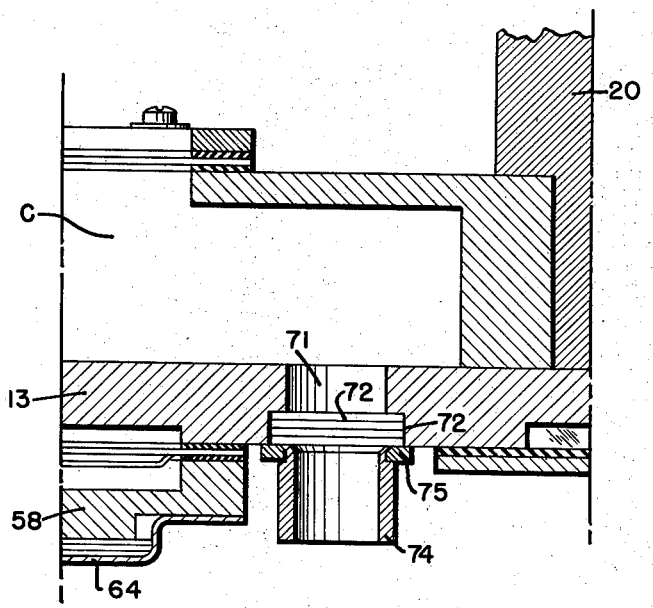
Figure 4 is a cross section through the unit of Fig. 1 on the lines 4—4 of Fig. 3.

Formed through base plate 13 is a circular bore 17 having an internally projecting annular shoulder or abutment 18 and registering with the upper end of bore 17 is a bore 19 through the body of casing 15. Within the aligned bores 17 and 19 and seated against the upper side of annular abutment 18 is a desiccator column 20 comprising a cylindrical tube 21 which can be formed of any material such as a transparent or opaque plastic having a reduced section 22 forming a shoulder 23 which can rest against the portion of the casing proximate the bore 19, as shown in Fig. 2, to establish the depth of the tube 20 within bores 18 and 19.

Figure 5:
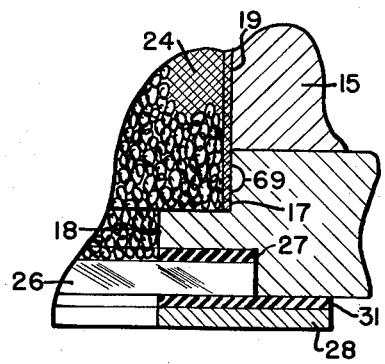
Figure 5 is an enlarged detail of a portion of Fig. 2.

Reduced section 22 will preferably be a pressed-in fit in bores 17 and 19, to the depth established by shoulder 23, to anchor tube 20 therein. The lower part of reduced section 22 is formed with perforations in its body and preferably, as shown in Fig. 5, is of a sieve-like formation in the form of a grid 24, for the purpose hereinafter described. Desiccator column 20 is filled with any suitable desiccant 25 which may conveniently be silica gel.

Held against the other face of abutment 18 is a circular window 26 of glass or other transparent plastic, a sealing ring 27 being interposed between the abutment face and the rim portion of the window. A cover plate 28 having a central cutout portion 29 mounts the window against the abutment by screws 30 which are suitably fastened in threaded bores (not shown) in base plate 13, a sealing ring 31 being arranged between cover plate 28 and windows 26. Thus, the crystals of silica gel or like desiccant will be retained in position in the column 20 by the transparent window 26, and the condition of the crystals can be observed therethrough at all times. As appears from Figs. 1 and 3, transparent window 26 extends below the instrument casing 11 and externally thereof, to permit this examination, so that, if a desiccant is used which will change color when saturated with moisture or otherwise in need of regenerating or replenishing, immediate detection of the condition will be noted and rectification can be made. Such indicating-desiccators are well known in the art and do not need specification herein.

In order to generate heat within the body of desiccant 25, to assist in driving therefrom absorbed or retained moisture, means are provided, according to the present invention, periodically to pass current through an electric resistance wire, under specific control of pressure differentials.

To this end, a resistance wire 32 is encased in a hollow glass or like transparent plastic tube 33 which tube is bodily immersed in the body or mass of silica gel 25. As shown in Fig. 2, the shape of the glass tube 33 and thus the resistance wire 32 being preferably helical convolutions with a center return, as illustrated, whereby to have as much surface thereof as possible in contact with the silica gel and also as even a distribution of heat through the silica gel as is possible to achieve. Wire 32 may be a length of coiled heating element, if desired, although a single strand of a resistance wire, as illustrated, will operate efficiently.

Desiccator column 20 is closed at its upper end by a plug 35 held in place by a screw 36, said plug being of insulating material and being bored as at 39 to receive and hold by a press fit the two ends of the tube 33 (Fig. 2).

Plug 35 is also bored as at 37 to provide breather holes through the plug to permit of the atmosphere inside casing 15 and chamber 11 to be in contact with the body of silica gel. The resistance wire 32 terminates in end contacts 38 carried in the parts of tube 33 housed within bores 39, and thin terminal lugs 40 and 41 extend from contacts 38 externally of column 20. To hold these lugs in place by a pressure fit, a cap 42 is mounted by three screws 43 on plug 35, said cap being bored at 44 with holes in register with and complementary to breather holes 37, four breather holes being illustrated.

Terminal lugs 40 and 41 are suitably connected in a circuit with power means and switching means, to be hereinafter described, whereby at certain times current is caused to flow through resistance wire 32, to heat the silica gel or other desiccant.

Thus, terminal lug 40 is connected to a feed-through contact pin 45 which extends through casing 15 and is mounted thereon by an insulating block 46, the connection being by a conductor 47 soldered to lug 40 and the end of pin 45 external of casing 15 (Fig. 1). Terminal lug 41 is suitably connected by a conductor 48 soldered thereto, to the negative side of a source of D. C. power 49, shown dotted in Fig. 1, the positive side of which is connected through contact pin 51 by a conductor 50 to the exterior end of another feed-pin 51, carried by an insulating block 52, and extending through casing 15 into its interior. The interior ends of feed-through pins 45 and 51 (Fig. 6) are thus capable of connection to switching means to control operation of heating of wire 32 from battery 49.

It is an important feature of the present invention to control by novel switching means the application of power to the resistance wire 32 in a portion of the cycle of ingress and egress of air to the interior of the instrument chamber 11, whereby to regenerate the desiccant in that portion of the cycle.

It is a further important feature of the present invention to control the ingress and egress of air to the interior of said chamber 11 in a cycle governed by the differential pressures within and without the instrument chamber 11.

These two advantages are of great use in airborne instruments particularly those having optical parts, such as the mirrors or lenses of a gun sight, where excess humidity might temporarily fog the mirrors or lenses and could ultimately permanently harm them and other parts of such precise mechanisms.

The main purpose of the present invention is to regularly change the body of air or other atmosphere inside the whole body of the instrument casing or chamber 11, namely the space A of Fig. 2, using a desiccated source of supply.

To this end, base plate 13 is recessed to form a space B, in which can move a valve seat 55 mounted to move with a flexible diaphragm member 56 which is rigidly held at its peripheral edge by a flange 57 of a shaped annular member 58 fastened to base 13 by bolts 59 in conventional manner.

An interiorly extending rib 60 is centrally bored to receive a valve pin 61 which is fixedly held by a screw-threaded member 62, the central boring being cut-away in places to provide a passageway 63, through which the external face of the diaphragm 56 may communicate with the atmosphere external of the unit 10.

A cover plate 64 perforated as at 66 and having an air filter 65 closes off the outside of the valve structure 55—61, this cover plate conveniently being fixed in position by the bolts 58.

Diaphragm 56 may have rubber gaskets 67 to pressure seal it in position at its peripheral edge, since it is desired to seal space B from the outside at all times except when valve seat 55 moves relative to valve pin 61 to open the valve port 68.

In order that space B may have communication with space A, namely, the interior of the instrument chamber proper, a narrow passageway 70 is provided through the body of base plate 13 terminating at one end in the wall of the recess forming space B and at the other end communicating with an annular channel 69 in the wall forming the bore 17 in base plate 13. Thereby, space B is in communication with space A through the passageway 70, the annular channel 69, the silica gel 25, and ports 37 in the plug 35 and cover plate 42.

The casing 15 of unit 10 has an interior space C which is normally isolated from spaces A and B by virtue of the structure illustrated. Space C is in communication at all times with the atmosphere surrounding the instrument casing 11 by virtue of a port 71 (Fig. 4) through the base plate 13 having an air filter 72 held in a recess 73 by a ring which also holds in place a funnel 74 which projects outwardly from the base plate 13. Therefore, the pressure in space C will always be that of the external atmosphere.

The upper plate forming the top face of the casing 15 is in part cut away in the form of a circular orifice and into this orifice is mounted by its peripheral edge a resilient diaphragm 75 by bolts 76, a rubber sealing washer 77 being utilized for sealing off space C. Carried by diaphragm 75 at its center is a depending pin 78 by means of a mounting block 79, the pin being axially adjustable relative to the diaphragm by means of a threaded extension 80 and a lock nut 81, pin 78 projecting into space C by an amount determined by said adjustments.

A pillar 82 carried within space C and fastened to base plate 13 by screws 83 holds a leaf spring 84 which is so shaped as lie partly in a horizontal plane so as to be contacted by the end of pin 78 and terminates in a vertical part carrying a connector 85 linked to one end of a toggle 86. Pillar 82 also holds a second leaf spring 87 spaced below but substantially parallel to the horizontal part of leaf spring 85, this second leaf spring 87 being linked to the other end of toggle 86. Thus, if pin 78 is moved downward to push spring 84 down, as can be caused by flexing of diaphragm 75 under pressure in space A, the toggle 86 will bring spring 87 up, and upon release of pressure, the resiliency of spring 84 and 87 will return the parts to normal, as is the condition of Fig 2, for example. This function is used for a dual purpose in the preferred construction of the apparatus according to the present invention. The primary purpose is used to operate valve means to permit fluid connection between spaces A and C.

To this end, a valve pin 88 is carried in an orifice in leaf spring 87 to move therewith. In cooperation with the valve pin a valve seat 89 is mounted in base plate 13, the orifice controlled by the valve thus formed communicating with space B and thus with the passageway 70. Thus, when the valve 88, 89 is opened by leaf springs 84 and 86 under urge of pin 78, and with valve 55—51 closed, spaces A and C are in fluid communication through the silica gel by means of passageway 70 and ports 37.

The second function defined is to simultaneously heat the silica gel or other desiccant when this fluid communication occurs since this is the egress part of the cycle.

Figure 6:
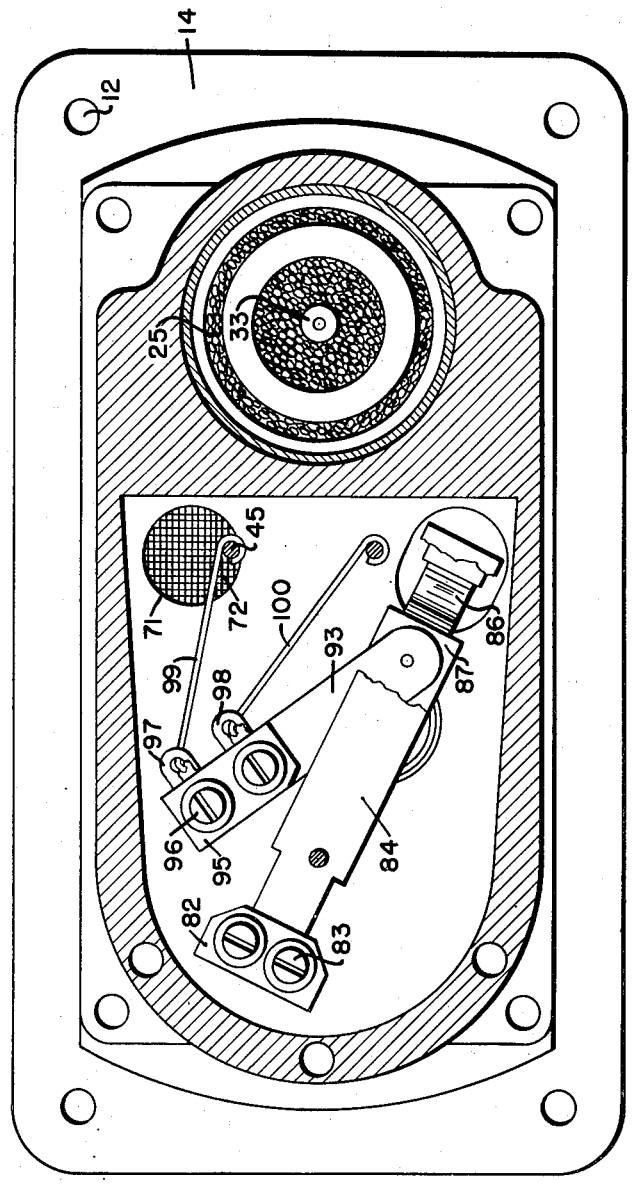
Figure 6 is a cross-section of the unit of Fig. 1 taken on the lines 6—6 of Fig. 2.

To this end, leaf spring 87 also carries to move therewith an insulating bumper 90 (Figs. 7 and 8) which acts when raised to press into engagement contacts 91 and 92 mounted on conducting springs 93 and 94 and carried at their other ends by a pillar 95, mounted on base plate 13 suitably by screws 96 (Fig. 6).

Springs 93 and 94 have terminal lugs 97 and 98 which are connected by conductors 99 and 100 to the portion of feedthrough terminal pins 45 and 51 which extend into the space C. By this means, upon raising of spring 87, contact is made as previously described to supply power to wire 32 and thus heat the silica gel. The conditions pertaining when pin 84 is depressed by the spheroidal flexing of diaphragm 75 are clearly shown in Fig. 8.

Therein it will be seen that valve pin 88 is unseated and contact is established between contacts 91 and 92. In this condition air will flow through the silica gel from ports 87 into passageway 70, by valve pin 88 into space C and out through funnel 74, the silica gel being heated and thus better able to give up any moisture contained thereby. During this operation valve seat 55 must remain closed since there is greater pressure inside than out.

In Fig. 7 the condition is shown where the pressure outside is greater than that inside. Here valve pin 88 must remain closed and valve seat 55 is open permitting air to flow into space B and through passageway 70, the silica gel and ports 37 to space A, giving up its contained water to the desiccant as it goes.

In both cases, as soon as the pressures inside and outside of the instrument casing are equalized, both valves will close and the condition of Fig. 1 will pertain.

In Figs. 9 and 10, a modified form of switching device is illustrated where a positive return is utilized to replace the resilient return shown in Fig. 8, for instance.

In this form, leaf spring 87 is dispensed with and leaf spring 84 carries a bracket 101 holding a pusher 102 in an angular position to act against one arm of a wide V shaped bar 103 pivoted at 104, the other arm of which lies in a horizontal plane and carries valve pin 88 and insulated bumper 90. Downward pressure of pin 78 by flexing of diaphragm 75 will result in a cam action with pusher 102 swinging the bar 103 about its pivot to raise valve seat 88 and bumper 90, as before, this action assisting the toggle action of the direct pressure of pin 78 on leaf spring 84 through toggle 86.

In Fig. 9 the parts of this modification are shown in non-operative position and in Fig. 10 they are shown with the switch parts closed and the valve pin 88 open.

It is obvious that the sensitivity of the device according to the present invention can be made to suit conditions of use, namely, the differential of pressures which are needed to operate the opposed valves can be chosen, by correct selection of diaphragms and by adjustment, for a small or a large change.

If very constant changes of air and control of humidity are required as some climates may make desirable, very small changes in altitude can be made effective since the device is extremely sensitive and precise in action.

Moreover, while means to heat the desiccant have been described, it is obvious that this could be dispensed with entirely or could be switched from the egress side to the ingress side or be arranged for both sides, if conditions warrant.

I claim:

1. A humidity control unit of the character described for attaching to an instrument casing comprising a first chamber with an orifice exposing same to the atmosphere external of the instrument casing; a flexible diaphragm in one wall of the first chamber adapted to be acted upon by the atmosphere internal of the instrument casing when same exceeds the pressure of the external atmosphere; a second chamber; a flexible diaphragm in one wall of said second chamber adapted to be acted upon by the external atmospheric pressure when same exceeds the internal atmospheric pressure; a passageway from said second chamber to a container having a body of desiccant therein; openings through said container to the interior of the instrument casing; a first valve operated by said second diaphragm upon increase of external atmospheric pressure to open to allow fluid flow of atmosphere inwardly into said second chamber, through said passageway, said desiccant and said openings into the interior of the instrument casing; and a second valve operated by said first diaphragm upon decrease of external pressure to open to allow fluid flow of said interior atmosphere through said openings, said desiccant, said passageway, said second chamber to said first chamber and out through said orifice to the external atmosphere; said valves closing when equilibrium pressure conditions are established between the interior and external atmospheres.

2. A humidity control unit of the character described for attaching to an instrument casing comprising a first chamber with an orifice exposing same to the atmosphere external of the instrument casing; a flexible diaphragm in one wall of the first chamber adapted to be acted upon by the atmosphere internal of the instrument casing when same exceeds the pressure of the external atmosphere; a second chamber; a flexible diaphragm in one wall of said second chamber adapted to be acted upon by the external atmospheric pressure when same exceeds the internal atmospheric pressure; a passageway from said second chamber to a container having a body of desiccant therein; openings through said container to the interior of the instrument casing; a first valve operated by said second diaphragm upon increase of external atmospheric pressure to open to allow fluid flow of atmosphere inwardly into said second chamber, through said passageway, said desiccant and said openings into the interior of the instrument casing; a second valve operated by said first diaphragm upon decrease of external pressure to open to allow fluid flow of said interior atmosphere through said openings, said desiccant, said passageway, said second chamber to said first chamber and out through said orifice to the external atmosphere; said valves closing when equilibrium pressure conditions are established between the interior and external atmospheres; an electrical heating element proximate said body of desiccant; and a switch in said first chamber operated with the closing of said second valve to cause power to be applied to said heating element, to heat said desiccant.

3. A humidity control unit for controlling the internal humidity conditions when attached to an instrument enclosure comprising a casing having three chambers, the first a chamber containing a desiccant, the second a chamber sealed from the external atmosphere by a flexible diaphragm and having a passageway communicating with the first chamber, the third a chamber communicating with the external atmosphere and having a flexible diaphragm sealing the chamber from the interior of the instrument enclosure, when the unit is attached thereto; orifices in the first chamber communicating with the interior of the instrument enclosure when the unit is attached thereto; a first valve operable by the diaphragm in the second chamber to allow passage of external atmosphere through said first chamber into the interior of the instrument enclosure; and a second valve operable by the diaphragm in the third chamber to allow passage of internal atmosphere through said first chamber to the exterior atmosphere.

4. A humidity control unit for controlling the internal humidity conditions when attached to an instrument enclosure comprising a casing having three chambers, the first a chamber containing a desiccant, the second a chamber sealed from the external atmosphere by a flexible diaphragm and having a passageway communicating with the first chamber, the third a chamber communicating with the external atmosphere and having a flexible diaphragm sealing the chamber from the interior of the instrument enclosure, when the unit is attached thereto; orifices in the first chamber communicating with the interior of the instrument enclosure when the unit is attached thereto; a first valve operable by the diaphragm in the second chamber to allow passage of external atmosphere through said first chamber into the interior of the instrument enclosure; a second valve operable by the diaphragm in the third chamber to allow passage of internal atmosphere through said first chamber to the exterior atmosphere and heating means acting to heat the desiccant in said first chamber during the time of passage of said internal atmosphere through the first chamber to the exterior atmosphere.

5. A humidity control unit for controlling the internal humidity conditions when attached to an instrument enclosure comprising a casing having three chambers, the first a chamber containing a desiccant, the second a chamber sealed from the external atmosphere by a flexible diaphragm and having a passageway communicating with the first chamber, the third a chamber communicating with the external atmosphere and having a flexible diaphragm sealing the chamber from the interior of the instrument enclosure, when the unit is attached thereto; orifices in the first chamber communicating with the interior of the instrument enclosure when the unit is attached thereto; a first valve operable by the diaphragm in the second chamber to allow passage of external atmosphere through said first chamber into the interior of the instrument enclosure, a second valve operable by the diaphragm in the third chamber to allow passage of internal atmosphere through said first chamber to the exterior atmosphere and heating means acting to heat the desiccant in said first chamber during the time of passage of said internal atmosphere through the first chamber to the exterior atmosphere said heating means including a heating element immersed in the desiccant in the first chamber; a normally open switch in the third chamber operated simultaneously with the opening of said second valve; and a power supply in circuit with said switch and heating element, said switch returning to normal open position to cut off power to the heating element when said valve closes.

6. A humidity control unit of the character described comprising a casing; a wall in said casing forming two chambers, one of said chambers having an opening to the external atmoshere and the other being sealed therefrom; a valve in said wall for permitting controlled communication between the chambers; a flexible diaphragm forming a wall of each chamber; connections between said valve and the diaphragm in said chamber having said opening; a second valve in a wall of said other chamber; connections between the second valve and the other diaphragm; a closed body of desiccant; a passageway from said other chamber to one side of said desiccant; and conduits leading from the other side of the desiccant.

7. A humidity control unit for the purpose described comprising in combination a base plate; a recess in said base plate; an apertured cover plate for said recess to form a first chamber; a bore through said base plate; a transparent window closing one side of said bore; a passageway connecting said bore and said first chamber; a casing attachable to said base plate; a bore through said casing registering with said bore through said base plate; a tube nested in said bores and in contact at one end with said window; a body of desiccant in said tube; an electrical heating element within said body of desiccant; an apertured cap for the other end of said tube; an orifice in one wall of the casing; a resilient diaphragm carried by its peripheral edge to cover said orifice and form said second chamber; an opening through the base plate communicating with said second chamber; an operating pin carried by said diaphragm to be moved thereby; a leaf spring held at one end in position below said pin and in said second chamber to be depressed by said pin when said diaphragm moves under pressure differentials; a toggle attached to the other end of the leaf spring; a pair of switching contacts normally in open relation and in a power circuit with said heating element; a normally closed valve between said first and second chamber; a bar operated by said toggle to simultaneously open said valve and cause said switching contacts to close, to apply power to said heating element; a second diaphragm mounted by its peripheral edge in said second chamber, closing same from said apertured cover; a second normally closed valve between second chamber and the external atmosphere; and operative connections between said second diaphragm and said second valve, to cause the latter to be opened by differential pressure on said second diaphragm; whereby said second valve can be opened to allow fluid passage from said second chamber through said passageway and through said desiccant tube to exit from said apertured cap or alternatively said first valve can be opened to allow fluid passage in the other direction through said cap and desiccant tube, through said passageway into said first chamber and out through said opening to the external atmosphere.

8. A humidity control unit for the purpose described comprising in combination a base plate; a recess in said base plate; an apertured cover plate for said recess to form a first chamber; a bore through said base plate; a transparent window closing one side of said bore; a passageway connecting said bore and said first chamber; a casing attachable to said base plate; a bore through said casing registering with said bore through said base plate; a tube nested in said bores and in contact at one end with said window; a body of desiccant in said tube; an apertured cap for the other end of said tube; an orifice in one wall of the casing; a resilient diaphragm carried by its peripheral edge to cover said orifice and form said second chamber; an opening through the base plate communicating with said second chamber; an operating pin carried by said diaphragm to be moved thereby; a leaf spring held at one end in position below said pin and in said second chamber to be depressed by said pin when said diaphragm moves under pressure differentials; a toggle attached to the other end of the leaf spring; a normally closed valve between said first and second chamber; a bar operated by said toggle to open said valve; a second diaphragm mounted by its peripheral edge in said second chamber, closing same from said apertured cover; a second normally closed valve between said second chamber and the external atmosphere; and operative connections between said second diaphragm and said second valve, to cause the latter to be opened by differential pressure on said second diaphragm; whereby said second valve can be opened to allow fluid passage from said second chamber through said passageway and through said desiccant tube to exit from said apertured cap or alternatively said first valve can be opened to allow fluid passage in the other direction through said cap and desiccant tube, through said passageway into said first chamber and out through said opening to the external atmosphere.

9. A humidity control unit as claimed in claim 7 wherein said heating element comprises a resistance wire carried in a glass tube of helical form with a central straight return, said tube being mounted in said apertured cap, and said cap having terminals connected to the end of the resistance wire, in order to connect same to a source of power.

10. A sealed instrument casing having humidity control of the interior atmosphere thereof comprising in combination a desiccant container containing a body of desiccant; conduits connecting one end of said container to the interior of the instrument casing; a first sealed chamber; a passageway connecting the other end of said container with said first chamber; a first flexible diaphragm forming one wall of said first chamber and exposed to external atmosphere; a normally closed valve operatively connected to said diaphragm to be opened thereby when the external atmospheric pressure exceeds that in the interior of the instrument casing to provide ingress of external atmosphere through the first chamber, the passageway, the desiccant container and conduits, to the interior of the instrument casing; a second chamber; a port in said chamber to the exterior atmosphere; a second flexible diaphragm forming one wall thereof and exposed to the internal atmosphere of the instrument casing; and a normally closed second valve between said first and second chambers operatively connected to said second diaphragm to be opened thereby when the internal atmospheric pressure exceeds that external atmospheric pressure, to provide egress of internal atmosphere through said conduits, the desiccant container, the passage, the second chamber and out through said port.

11. A sealed instrument casing having humidity control of the interior atmosphere thereof comprising in combination a desiccant container containing a body of desiccant; conduits connecting one end of said container to the interior of the instrument casing; a first sealed chamber; a passageway connecting the other end of said container with said first chamber; a first flexible diaphragm forming one wall of said first chamber and exposed to external atmosphere; a normally closed valve operatively connected to said diaphragm to be opened thereby when the external atmospheric pressure exceeds that in the interior of the instrument casing to provide ingress of external atmosphere through the first chamber, the passageway, the desiccant container and conduits, to the interior of the instrument casing; a second chamber; a port in said chamber to the exterior atmosphere; a second flexible diaphragm forming one wall thereof and exposed to the internal atmosphere of the instrument casing; a normally closed second valve between said first and second chambers operatively connected to said second diaphragm to be opened thereby when the internal atmospheric pressure exceeds the external atmospheric pressure, to provide egress of internal atmosphere through said conduits, the desiccant container, the passage, the second chamber and out through said port; an electrical heating element in the desiccant container; a normally open switch in said second chamber operatively connected with said second diaphragm to be simultaneously closed with the opening of said second valve; and a power supply in circuit with said switch and heating element, to cause heating of the desiccant during the egress of internal atmosphere.

12. A humidity control unit as and for the purpose described comprising a desiccant container; a body of desiccant therein; openings at one end to expose the desiccant to an atmosphere; a first sealed chamber; a conduit connecting said first chamber with the other end of said container, a first flexible diaphragm forming one wall of said first chamber; a normally closed valve operatively connected to said first diaphragm to be opened thereby to provide flow of atmosphere through the first chamber, the conduit, the desiccant and out through the openings; a second chamber; a port through a wall of the second chamber; a second flexible diaphragm forming a wall of the second chamber; and a normally closed valve between the first and second chambers operatively connected to said second diaphragm to be opened thereby to provide reverse flow of atmosphere through said desiccant from the openings in the container to the port in the second chamber.

13. A humidity control unit as and for the purpose described comprising a desiccant container; a body of desiccant therein; openings at one end to expose the desiccant to an atmosphere; a first sealed chamber; a conduit connecting said first chamber with the other end of said container, a first flexible diaphragm forming one wall of said first chamber; a normally closed valve operatively connected to said first diaphragm to be opened thereby to provide flow of atmosphere through the first chamber, the conduit, the desiccant and out through the openings; a second chamber; a port through a wall of the second chamber; a second flexible diaphragm forming a wall of the second chamber; a normally closed valve between the first and second chambers operatively connected to said second diaphragm to be opened thereby to provide reverse flow of atmosphere through said desiccant from the openings in the container to the port in the second chamber; an electrical heating element immersed in said desiccant; a switch in said second chamber operated simultaneously with said valve by said second diaphragm; and a power supply in circuit with said switch and heating element, to cause heating of the desiccant during the reverse flow only.

AZOR D. ROBBINS.

REFERENCES CITED

The following references are of record in the file of this patent:

UNITED STATES PATENTS

| Number | Name | Date |
| --- | --- | --- |
| 2,439,793 | Braddon | Apr. 20, 1948 |
| 2,465,162 | Lockwood | Mar. 22, 1949 |
| 2,506,578 | Case | May 9, 1950 |
| 2,511,666 | Barr | June 13, 1950 |